H. E. WOOD.
PROCESS OF RECOVERING METALS FROM ORES.
APPLICATION FILED MAY 11, 1916.
1,263,503.
Patented Apr. 23, 1918.
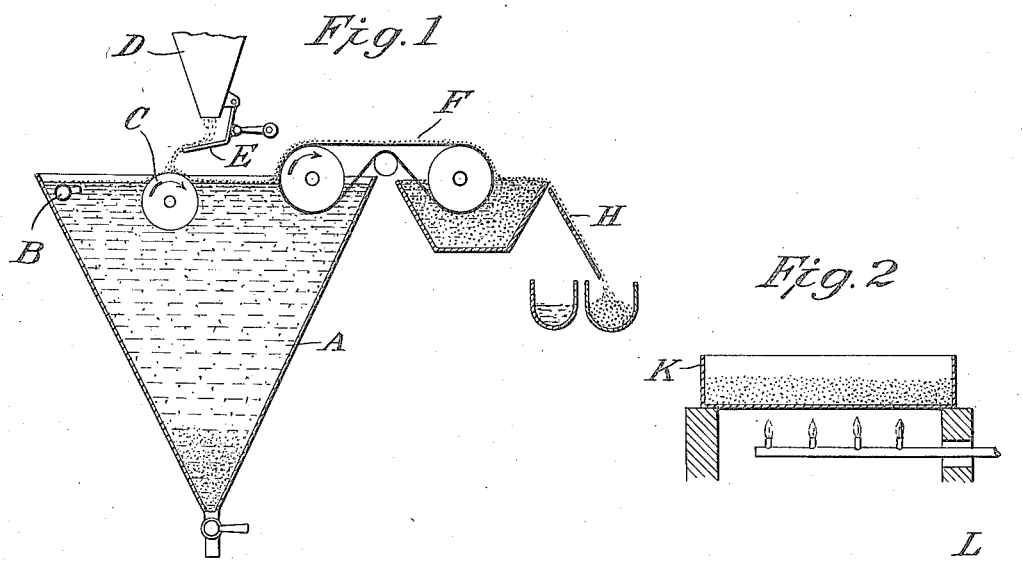
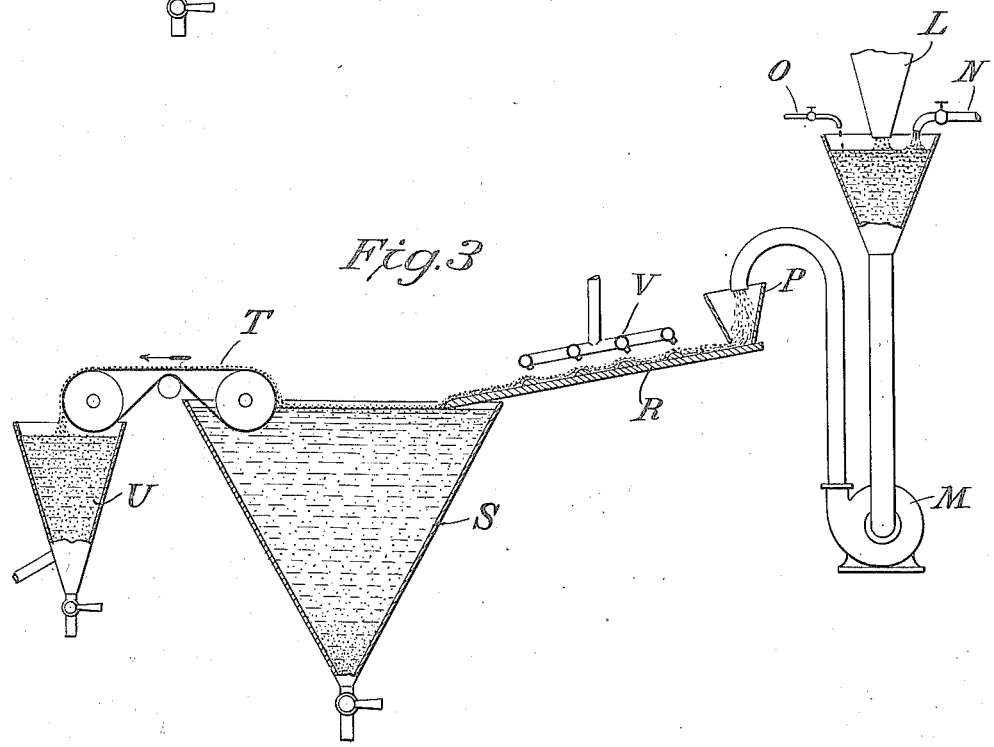

UNITED STATES PATENT OFFICE.

HENRY E. WOOD, OF DENVER, COLORADO.

PROCESS OF RECOVERING METALS FROM ORES.

1,263,503.  Specification of Letters Patent.  Patented Apr. 23, 1918.

Application filed May 11, 1916. Serial No. 96,755.

*To all whom it may concern:*

Be it known that I, HENRY E. WOOD, a citizen of the United States, residing at Denver, in the county of Denver and State of Colorado, have invented certain new and useful Improvements in Processes of Recovering Metals from Ores, of which the following is a full, clear, and exact description.

One of the well known processes of recovering the values from metalliferous ores is by the adoption of the flotation principle in which the surface tension of a body of water is taken advantage of to float the metal particles while the gangue sinks and to recover such particles by spillways, by movable belts or other means. For such processes and for many forms of special apparatus employed in carrying them out, numerous patents have been granted and descriptions published, the disclosures of which, for purposes of this case, will be largely assumed as a part of the store of knowledge possessed by those to whom this specification is addressed.

My present invention pertains to the processes of the particular character above indicated, and is the result of long study and experiment to increase the useful proportion of the metal or values recovered from a given quantity of ore. I shall describe in its entirety the process in which my improvements reside and shall indicate more specifically those features which I believe to be novel and to constitute the basis for such claims as are hereto appended.

In order that the nature and purposes of my invention may be the better understood I may select for consideration herein one of the molybdenite ores, in which there is closely associated with the metal a complex iron sulfid gangue chiefly of pyrrhotite. I crush this ore to 10 mesh or finer and from this I recover as much as possible of the metal by the dry flotation process, having found that this is the most effective means known in the art for such purpose. In a condition of fineness of about 10 mesh, however, the particles of molybdenite, if dropped on the water from too great a height, say one inch, are apt to sink, but if fed from a less height, the finer sized particles of the iron, which although generally not so capable of floating, are still likely to do so to an inconvenient extent. The result is that while the tailings will be found to be very clean, as the average recovery of molybdenite under such circumstances easily exceeds 95%, the concentrate is not rich enough to meet market requirements, assaying perhaps 30% to 60%, while 90% is the grade sought.

With the object therefore of obtaining a concentrate of higher grade my aim is to separate as much of the iron and gangue from the molybdenite as possible by this first step of concentration and then to retreat or as it is usually termed reclean this concentrate to leave the real values in a purer state. This involves a number of difficult problems which have thus far proved unsurmountable to workers in this art.

By reason of the subsequent steps to which the ores that I contemplate treating are subjected, it is practicable and feasible to recover by any of the heretofore known dry flotation processes all such materials as float off or are removed by the traveling take-off belts in the flotation machines, and which comprise values, middlings and mud, and to regrade and treat them in the same way as concentrates of a more carefully prepared and higher grade. I therefore collect all of such materials and subject them to a drying temperature, not as high as would ordinarily be used in roasting them, but merely sufficient to partially oxidize the iron sulfid constituents to a point where they will exhibit a stronger tendency to sink. This does not affect the flotation tendencies of the molybdenite particles, appreciably, if at all.

After this treatment the concentrate is, preferably, recrushed or ground, either wet or dry to a 30 or 40 mesh size. This step I have found very desirable, as it yields a greately improved result.

The material is then fed to a pump, agitator, or other like device, where it is thoroughly mixed with a very small proportion of oil which is automatically added in definite quantities, and from this pump or agitator the wet mixed ore and oil are delivered to an inclined plane set at a very slight inclination and carrying the material to the surface of the water in a second flotation machine, which in all other essential respects may be the same as that employed in the first step.

As the material passes down the inclined plane in a thin sheet or stream jets of air are intermittently directed upon it in such manner as to temporarily impede the water current and thereby expose the oiled particles to the air. By properly constructed apparatus all points of the stream are thus intermittently checked and all of the solid particles are one time or another exposed to the air with the result that the oiled sulfids come to the surface so that when they reach the body of water in the tank the undesirable particles all sink while the molybdenite particles float off and are recovered by the moving take-off belts or in other and well known ways.

The use of a dewatering screen such as is commonly used with machines of this type is not essential in either the first or the second flotation tank, but it is only necessary to collect the concentrates in the usual launders and to then drain off the excess of water.

As a final step the concentrates are heated to a point at which the oil may be readily ignited and rapidly burned off without loss of the moylbdenum by oxidation.

I have annexed hereto a drawing as a matter of convenience. This is largely diagrammatic as I am dealing only with devices well known in the art, but it represents the more essential devices that are required in carrying out the process above described.

Figure 1 is a sectional diagram of the flotation device used in the first step of recovering the metal.

Fig. 2 is a similar sectional view of a receptacle in which the concentrates are heated and partially oxidized.

Fig. 3 is a sectional view of an agitator combined with a second flotation tank, and Fig. 4 is a front elevation of the means for directing air jets upon the stream flowing into the second tank.

As above stated, the illustrations being of well known devices are largely conventional in character. A represents a flotation tank maintained full of water by a series of jets B, which induce a current along the surface toward a partially submerged roller C, upon which the crushed ore is delivered from a hopper D which drops it upon an oscillating plate E.

The floating particles after passing from the roller C are taken up by the traveling belt F and delivered to a receptacle G, from whence they pass with the overflow over the dewatering screen H, if this device be used, or simply into an ordinary launder.

After being dewatered the concentrate is placed over gas jets in any suitable receptacle K, where it is heated sufficiently to partially oxidize the iron constituents. It is then inserted in a hopper L. from whence it is fed to an agitator of any suitable kind such as a centrifugal pump M., together with water through pipe N. and a small and regulable quantity of oil through pipe O.

From the pump when the material is thoroughly mixed with the oil, it is delivered to a hopper P, from which it runs down a slightly inclined plane R. onto the surface of a second flotation tank S. from which the floating particles are carried by the usual take off belts T. and delivered to a receptacle U. As the stream flows down the plane R, a series of parallel tubes V. with jets therein directs upon the water a number of air blasts, and, as indicated in Fig. 4 these tubes should be capable of side movement as indicated by the dotted lines in Fig. 4 so that all portions of the surface of the stream will be alternately exposed and withdrawn from the action of the air jets, to expose all the solid particles which it contains to the air.

No special device is shown or needed for drying and heating the material recovered from the receptacle U. into which it is delivered and for subsequently burning off the oil. It is moreover manifest that in carrying out the other steps of the process any well known forms of apparatus suitable for such purposes may be employed.

From the above it appears that the complete process for the treatment of such ores as that mentioned or any others to which it may be applied, and involving all the steps enumerated from the preliminary crushing of the ore to the burning off of the oil is, specifically considered, the invention for which I now seek protection by Letters Patent. Such of the steps of this process as I believe to be novel, I have specified in the claims.

What I therefore claim is:

1. The process herein described of recovering metal from ores, which consists in recovering from dry crushed ore concentrates by the film tension flotation process, heating the concentrates to oxidize the undesirable metallic particles, mixing the oxidized concentrate with a small quantity of oil, passing the same to a flotation tank, and by an intermittent air blast exposing the metal particles to air on their passage to said tank, recovering the values from the oiled concentrate by the flotation process, and then removing the excess of oil therefrom.

2. The steps in the process of recovering metals from their ores, which consist in producing from the dry crushed ore a concentrate by the film tension flotation process, heating the concentrate sufficiently to oxidize the undesirable constituents recrushing or grinding the concentrate to a finer state of subdivision and removing the values therefrom by a second flotation process.

3. The process of recovering values from crushed ore, which consists in floating the finely divided ore down an inclined plane to a body of water in a flotation tank, intermittently checking the flowing stream of water by jets of air to expose the metal particles therein to the air, and recovering the floating metal particles from the tank.

4. The process of recovering non-oxidized values from crushed ores, which consists in producing a concentrate by subjecting the dry crushed ore to the film tension flotation process, mixing the wet concentrate with oil and subjecting it again to the film tension flotation process.

5. The process of recovering non-oxidized values from crushed ores, which consists in producing a concentrate of the dry ore by the film tension flotation process, heating the wet concentrate to oxidize its undesirable constituents, mixing the dried concentrate with water and oil and recovering the oiled metal particles therefrom by again subjecting the concentrate to the film tension flotation process.

6. The process of recovering values from crushed ores, which consists in producing a concentrate from the dry crushed ore by the film tension, flotation process, heating and grinding the concentrate to a finer state of subdivision and then recovering the metal particles therefrom by the flotation process.

In testimony whereof I hereunto affix my signature.

HENRY E. WOOD.